Patented Jan. 25, 1949

2,460,226

UNITED STATES PATENT OFFICE 2,460,226

BIOTIN INTERMEDIATE

Stanton A. Harris, Westfield, and Glen E. Arth, Rahway, N. J., assignors to Merck & Co., Inc., Rahway, N. J., a corporation of New Jersey No Drawing. Application December 15, 1945, Serial No. 635,428

12 Claims. (Cl. 260—329)

This invention is generally concerned with novel chemical compounds and processes of preparing the same; more particularly it relates to novel compounds useful as intermediates in synthesis of growth-promoting factor biotin.

This is a continuation-in-part of co-pending application Serial No. 554,454, filed September 16, 1944.

Biotin is known to be one of the isomers of the chemical compound 2-(4'-carboxy-butyl)-3:4-ureido-tetrahydrothiophene, having the empirical formula $C_{10}H_{16}O_3N_2S$, and the structural formula:

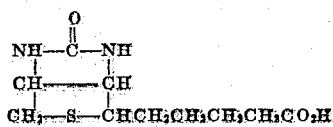

It is now found that this compound can be synthesized by reactions indicated as follows:

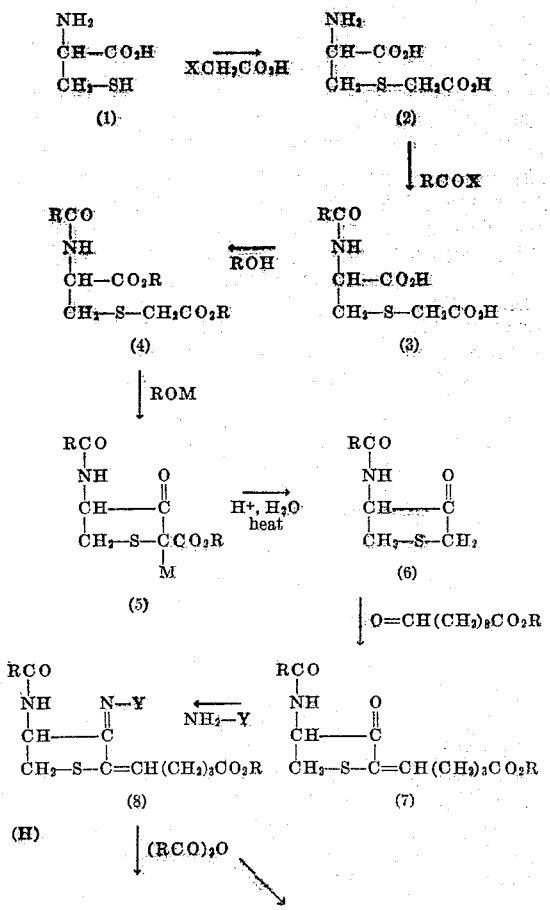

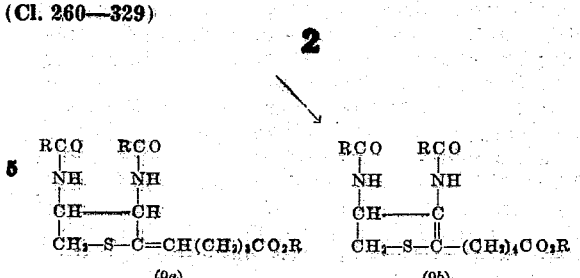

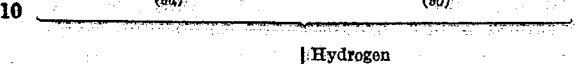

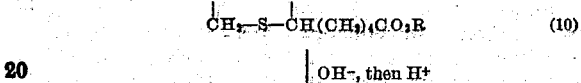

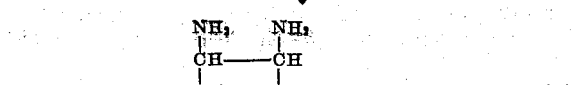

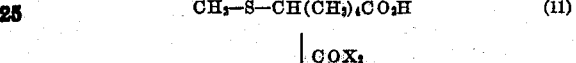

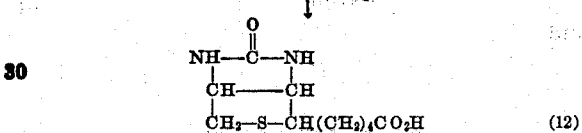

In the above formulae, R represents an alkyl, aryl or arylalkyl group; X, a halogen; Y—N= a radical selected from the group which consists of oximino, arylhydrazino and semicarbazido radicals, and M an alkali metal or an alkaline earth metal.

The reactions above indicated are conducted as follows: 2-amino-3-mercapto-propanoic acid (1) and chloroethanoic acid are condensed in an alkaline aqueous solution to form 2-amino-3-carboxymethyl-mercapto-propanoic acid (2); which is then treated with an acylating agent, such as an acyl halide, in an aqueous alkaline solution to yield 2-acylamido-3-carboxymethylmercapto-propanoic acid (3). This product is esterified using a mineral acid catalyst to produce the diester (4) of the acid (3), and the diester is treated with alkali metal alcoholate or an alkaline earth metal alcoholate to yield the 2-alkali metal or the 2-alkaline earth metal derivative of an ester of 2 - carboxy - 3 - keto - 4 - acylamido - tetrahydrothiophene (5). This compound, when heated with a dilute mineral acid, is hydrolyzed and decarboxylated to produce 3-keto-4-acylamido-tetrahydrothiophene (6) which, when reacted with 4-carboxy butanal ester in a lower aliphatic alcohol reaction medium containing piperidine and a lower aliphatic carboxylic acid, produces an ester of 2-(4'-carboxybutylidene)-3-keto-4-acylamido-tetrahydrothiophene (7). This product, when reacted with a compound of the class which consists of hydroxylamine, arylhydrazines, semicarbazide, and salts thereof, yields an ester of the corresponding 3-nitrogen substitution product of 2-(4'-carboxybutylidene)-3-keto-4-acylamido-tetrahydrothiophene (8) which upon treatment with a mixture of zinc, a lower aliphatic acid and a lower aliphatic acid anhydride, produces a mixture of 2-(4'-carboxy-butylidene)-3:4-di(acylamido)-tetrahydrothiophene ester (9a) and 2-(4'-carboxybutyl)-3:4-di(acylamido)-4:5-dihydrothiophene ester (9b). This mixture, or if preferred, one of the components, is then treated with hydrogen in the presence of a hydrogenation catalyst to yield 2-(4'-carboxy-butyl)-3:4-di(acylamido)-tetrahydrothiophene ester (10). When this last mentioned compound is treated with an aqueous alkaline solution, hydrolysis of the acyl groups occurs, yielding upon acidification, 2-(4'-carboxy-butyl)-3:4-diamino-tetrahydrothiophene (11) which, when reacted with a carbonyl halide, produces the compound 2-(4'-carboxy-butyl)-3:4-ureido-tetrahydrothiophene. This product is obtained as a mixture of stereoisomers, one of which is racemic biotin, from which upon resolution, is obtained the dextrorotatory isomer, biotin.

This invention is concerned with the intermediates numbered 9a and 9b above, namely 2-(4'-carboxy-butylidene)-3:4-di(acylamido)-tetrahydrothiophenes and their isomers, 2-(4'-carboxy-butyl)-3:4-di(acylamido)-4:5-dihydrothiophene, together with esters of each of the isomers represented by the formulae:

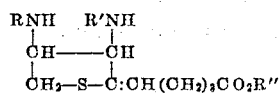

and

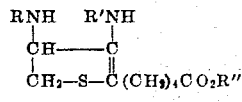

wherein R and R' are acyl groups and R'' is of the class consisting of hydrogen, aryl, alkyl and arylalkyl.

According to the present invention, compounds of the above formulae are obtained as a mixture of the isomers by treating an ester of a compound of the class which consists of oximes, arylhydrazones and semicarbazones of the ketone, 2-(4-carboxy-butylidene)-3-keto-4-acylamido-tetrahydrothiophene, with an acylating-reducing agent such as a mixture of zinc, a lower aliphatic acid and a lower aliphatic acid anhydride whereby the substituent in the 3-position is simultaneously reduced by nascent hydrogen resulting from interaction of the zinc and the acid, and acylated by the acid anhydride. The corresponding acids are obtained from the esters by saponification followed by treatment with an acid.

The starting materials, used in practicing the process according to this invention, namely the oximes, arylhydrazones and semicarbazones of 2-(4'-carboxy-butylidene)-3-keto-4-acylamido-tetrahydrothiophene esters, can be obtained by the chemical reactions indicated above and described in detail in co-pending applications Serial Nos. 554,458; 554,449 now Patent 2,437,719; 554,450; 554,451 and 554,452 all filed September 16, 1944 and Serial No. 635,427 filed December 15, 1945.

One of these isomers can be converted by operations indicated above and described in co-pending applications Serial Nos. 554,456 and 554,457 both filed September 16, 1944 and Serial No. 635,426 filed December 15, 1945, into the vitamin biotin.

Inasmuch as the 4-acylamido substituent of the starting material used in practicing the process according to this invention remains unaffected by the process wherein the products according to the invention are obtained, it is evident that usual simple 4-acylamido substituted compounds of that type can be used, for example the following can be employed in the present process:

2-(4'-carboxy-butylidene)-3-(p-nitrophenylhydrazino)-4-acetamido-tetrahydrothiophene esters.

2-(4'-carboxy-butylidene)-3-semicarbazido-4-benzamido-tetrahydrothiophene esters.

2-(4'-carboxy-butylidene)-3-(p-nitrophenylhydrazino)-4-propionamido-tetrahydrothiophene esters.

Likewise variation in the ester group does not affect materially the course of the reaction; methyl, ethyl, propyl, butyl, or other lower alkyl, and phenyl, benzyl and other aryl and arylalkyl esters can be used satisfactorily.

The following examples illustrate methods of carrying out the present invention, but it is to be understood that these examples are given by way of illustration and not of limitation.

*Example 1*

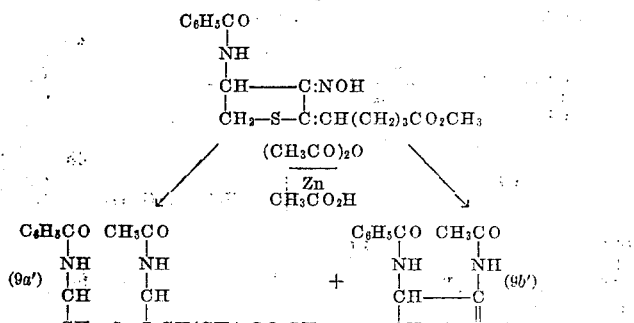

About 10 g. of zinc dust is slowly added, with agitation to a cold mixture of 50 cc. of acetic anhydride, 50 cc. of glacial acetic acid, and about 3.2 g. of 2-(4'-carbomethoxy-butylidene)-3-isonitroso-4-benzamido-tetrahydrothiophene and agitation of the mixture is continued for about 16 hours thereafter, the temperature of the reaction mixture being permitted to rise gradually to about room temperature. Zinc particles in the mixture are then removed, and the solution is evaporated under diminished pressure to obtain a white residue. This residue is suspended in water, warmed to about 50° C. to decompose any remaining acetic anhydride, cooled and acidified to congo with hydrochloric acid resulting in the precipitation of crude 2-(4'-carbomethoxy-butylidene) -3- acetamido -4- benzamido-tetrahydrothiophene (9a') together with its corresponding isomer; 2-(4'-carbomethoxy-butyl)-3-acetamido-4-benzamido-4:5-dihydrothiophene (9b'). This crude product is removed and purified by known methods.

The crude mixture obtained as a product above comprises a mixture of two stereoisomeric racemates, which when fractionally crystallized from methanol yields a first racemic mixture (M. P. 185–186° C.) corresponding to formula (9b') above, and a relatively more soluble second racemic mixture (M. P. 162–163° C.) corresponding to formula (9a') above.

By saponifying 2-(4'-carbomethoxy-butylidene) -3- acetamido -4- benzamido-tetrahydrothiophene or its isomer with warm alkali in aqueous alcohol, followed by acidification of the mixture, the corresponding acid, 2-(4'-carboxy-butylidene)-3-acetamido -4- benzamido-tetrahydrothiophene or its isomer is obtained. The first racemate when thus treated yields a first racemic acid mixture (M. P. 177° C.); the second racemate yields a second racemic acid mixture (M. P. 207° C.)

Example 2

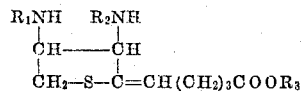

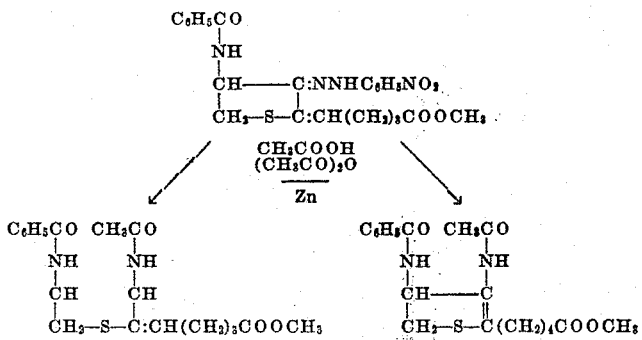

About 140 gms. of zinc dust is added to a mixture containing about 200 cc. glacial acetic acid and 200 cc. acetic anhydride and this mixture is cooled to approximately 5° C. About 10 gms. of 2- (4'- carbomethoxy-butylidene)- 3 -(p-nitrophenyl - hydrazino)- 4- benzamido-tetrahydrothiophene is added portionwise over a 10 minute period with good agitation; at the same time maintaining a temperature of approximately 5° C. Following the addition, the stirring is continued for about 7 hours at 2° C., the zinc dust is filtered off and the solution allowed to stand overnight at about 0° C. The following day the solution is evaporated to dryness under reduced pressure and the dry product dissolved in water to decompose residual acetic anhydride. The resulting aqueous solution is extracted three times with chloroform, the chloroform extract is washed with a small amount of water, dried over sodium sulfate and concentrated to small volume. The small amount of solid present, which is by-product diacetyl-p-phenylene-diamine, is removed by filtration. A small amount of alcohol and ether is then added to the clear chloroform concentrate and the solution stirred until a crystalline precipitate forms. This precipitate is filtered and recrystallized from ethanol to produce pure 2-(4'-carbomethoxy-butyl)-3-acetamido -4- benzamido-4:5-dihydrothiophene; M. P. 185° C.

Modifications may be made in carrying out the present invention without departing from the spirit and scope thereof and the invention is to be limited only by the appended claims.

We claim:

1. An alkyl ester of a 2-(4'-carboxy-butylidene)-3:4-di(acylamido)-tetrahydrothiophene.

2. The methyl ester of 2-(4'-carboxy-butylidene)-3-acetamido - 4 - benzamido-tetrahydrothiophene.

3. 2-(4'-carboxy-butylidene) - 3 - acetamido-4'-benzamido-tetrahydrothiophene.

4. Butylidene substituted tetrahydrothiophenes having the following structure:

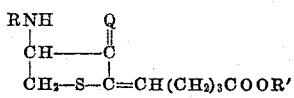

where $R_1$ and $R_2$ are acyl radicals, and $R_3$ is a radical selected from the group which consists of hydrogen, alkyl radicals, aryl radicals and aralkyl radicals.

5. The process of preparing polyhydrothiophenes containing a 3-acylamido substituent, which comprises reacting, with zinc and a lower aliphatic acid, a compound having the formula:

$$CH_2-S-C=CH(CH_2)_3COOR'$$

(with RNH and Q substituents on the ring carbons)

wherein R is acyl, R' is a radical selected from the class which consists of alkyl, aryl and aralkyl radicals, and Q is a radical selected from the class which consists of oximino, arylhydrazino and semicarbazido radicals, said reaction being carried out in the presence of a lower aliphatic acid anhydride.

6. The process of preparing polyhydrothiophenes containing a 3-acetamido substituent, which comprises reacting, with zinc and acetic acid, a compound having the formula:

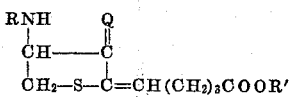

wherein R is acyl, R' is a radical selected from the class which consists of alkyl, aryl and aralkyl radicals, and Q is a radical selected from the class which consists of oximino, arylhydrazino and semicarbazido radicals, said reaction being carried out in the presence of acetic anhydride.

7. The process of preparing polyhydrothiophenes, containing a 3-acetamido substituent which comprises reacting 2-(4'-carbomethoxy-butylidene)-3-isonitroso-4-benzamido-tetrahydrothiophene with zinc, acetic acid and acetic anhydride.

8. The process of preparing polyhydrothiophenes containing a 3-acetamido substituent, which comprises reacting 2-(4'-carbomethoxy-butylidene)-3-(p-nitrophenylhydrazino)-4-benzamido-tetrahydrothiophene with zinc, acetic acid and acetic anhydride.

9. The process of preparing polyhydrothiophenes containing a 3-acylamido substituent, which comprises reacting 2-(4'-carboalkoxy-butylidene)-3-isonitroso-4-acylamido-tetrahydrothiophenes with zinc, a lower aliphatic acid and a lower aliphatic acid anhydride.

10. Aryl esters of 2-(4'-carboxy-butylidene)-3:4-di(acylamido)-tetrahydrothiophene.

11. Aralkyl esters of 2-(4'-carboxy-butylidene)-3:4-di(acylamido)-tetrahydrothiophene.

12. DI-2-(4'-carbomethoxy-butylidene)-3-acetamido-4-benzamido-tetrahydrothiophene, having, when in substantially pure form, a melting point of 162–163° C.

STANTON A. HARRIS.
GLEN E. ARTH.

No references cited.